United States Patent [19]

Coligionis

[11] Patent Number: 5,402,266
[45] Date of Patent: Mar. 28, 1995

[54] VEHICLE REFLECTOR UNIT

[75] Inventor: George Coligionis, Brakpan, South Africa

[73] Assignee: Peter John Cowling, South Africa; a part interest

[21] Appl. No.: 59,560

[22] Filed: May 10, 1993

Related U.S. Application Data

[62] Division of Ser. No. 759,467, Sep. 13, 1991, Pat. No. 5,210,642.

[30] Foreign Application Priority Data

Sep. 11, 1990 [ZA] South Africa ............ 90/7341

[51] Int. Cl.6 ............................................. G02B 5/136
[52] U.S. Cl. .................................... 359/548; 359/549; 359/850; 359/900
[58] Field of Search ............... 359/520, 524, 527, 533, 359/548, 549, 850, 900, 854, 855, 861, 864, 866; 362/83.1

[56] References Cited

U.S. PATENT DOCUMENTS

| | | | |
|---|---|---|---|
| Re. 17,274 | 4/1929 | Porter | 359/864 |
| 1,481,057 | 1/1924 | Gott | 362/81 |
| 1,482,769 | 2/1924 | Sutton | 362/81 |
| 1,837,085 | 12/1931 | Van Gelder | 359/855 |
| 1,892,860 | 1/1933 | Wehr et al. | 359/866 |
| 2,514,989 | 7/1950 | Buren | 359/866 |
| 3,187,628 | 6/1965 | Canns et al. | 359/866 |
| 3,429,051 | 2/1969 | Lutz et al. | 359/850 |
| 3,458,245 | 7/1969 | Stanley | 359/533 |
| 3,541,606 | 11/1970 | Heenan et al. | 359/533 |
| 3,667,833 | 6/1972 | Baldwin, Sr. | 359/864 |
| 4,223,980 | 9/1980 | Shafar | 359/549 |
| 4,245,888 | 1/1981 | Wardecki | 359/549 |
| 4,299,442 | 11/1981 | Buckelew | 359/549 |
| 4,643,544 | 2/1987 | Loughran | 359/866 |
| 5,210,642 | 5/1993 | Coligionis | 359/548 |

OTHER PUBLICATIONS

J. C. Whitney & Co., Parts & Accessories, Catalog No. 430D, Copyright 1983 pp. 92, 93 and 105.

*Primary Examiner*—Loha Ben
*Assistant Examiner*—James Phan
*Attorney, Agent, or Firm*—Frost & Jacobs

[57] ABSTRACT

This invention relates to a reflector unit for attachment to the sides of abnormally long vehicles and trailers. The reflector units have reflecting surfaces which reflect incident light towards the rear, sides and front of the vehicle thereby providing an indication, particularly at night, of the overall length of the vehicle. It is envisaged that this will reduce the hazards of overtaking abnormally long vehicles at night.

6 Claims, 3 Drawing Sheets

VEHICLE REFLECTOR UNIT

This is a divisional of application Ser. No. 07/759,467, filed Sep. 13, 1991, now U.S. Pat. No. 5,210,642.

INTRODUCTION

This invention relates to a reflector unit for mounting on the sides of vehicles.

BACKGROUND TO THE INVENTION

In many countries it is compulsory for vehicles which are used on public roads and thoroughfares to have light reflectors mounted on the rear of the vehicles. In addition to the standard reflectors, most heavy vehicles and trailers have light reflecting chevrons mounted at the rear of the vehicle to warn other vehicles approaching from the rear that an abnormally long vehicle is ahead.

One problem encountered by road users is that when travelling at night, while the rear reflectors and chevrons warn one that a heavy or abnormally long vehicle is ahead, they give no indication of the overall length of the vehicle. Attempts have been made to partly alleviate this problem by printing, in numerals or letters, the length of the vehicle at the rear of the vehicle but, in the absence of visible reference points, it remains difficult to judge the distance, particularly at night, and, consequently, hazardous to execute an overtaking manoeuvre.

The same difficulty can apply to the assessment of the length of a truck from the front and side.

OBJECT OF THE INVENTION

It is an object of this invention to provide a reflector unit which at least partly alleviates the above difficulties.

SUMMARY OF THE INVENTION

In accordance with this invention there is provided a reflector unit securable to the side of a vehicle and having reflective surfaces capable of reflecting incident light towards the rear, side and front of the vehicle.

There may be a single arcuate face arranged in use to reflect incident light towards the rear, side and front of the vehicle, or separate reflective surfaces.

There is further provided for the reflector unit to be securable to the side of the vehicle by means of an adhesive strip, alternatively there is provided for the reflector unit to be so securable by at least one bolt and nut, the bolt extending approximately normally from the base of the reflector unit and which, in use, is locatable through an aperture in the side of the vehicle whereupon it is secured by the nut.

Further features of the invention provide for the reflector unit to be of a plastics material and for the reflective surfaces to be formed by light reflective tape, alternatively for the reflective surfaces to be formed by reflective plastics material or glass lenses.

The invention extends to a method of enhancing the visibility of a vehicle comprising attaching a number of the above reflector units in a spaced apart configuration to at least one side of the vehicle, the reflector units being orientated to reflect incident light towards the rear, side and front of the vehicle and for the spacing between the reflector units to be approximately equal to the spacing between reflector units used to demarcate roadways.

The invention extends to a vehicle having a number of the above reflector units attached to at least one of its sides.

BRIEF DESCRIPTION OF THE DRAWINGS

The above and additional features of the invention will be described below by way of example only and with reference to the accompanying drawings in which.

DETAILED DESCRIPTION OF THE DRAWINGS

Figure 1:
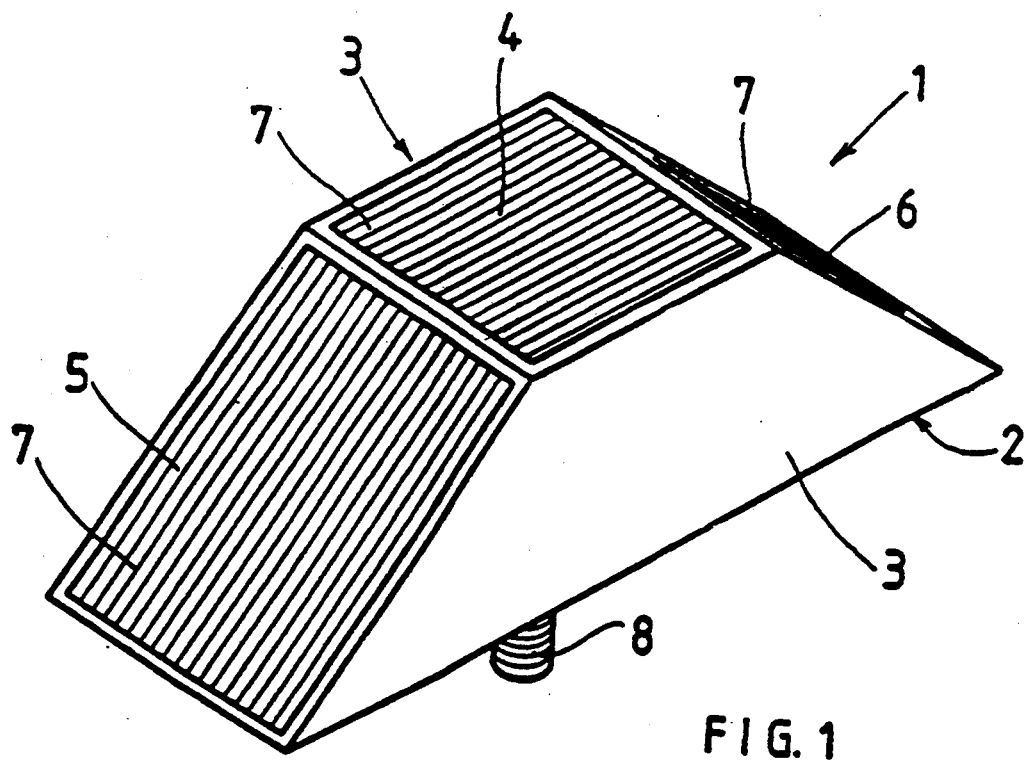
FIG. 1 is an isometric view of one embodiment of a reflector unit according to the invention.

Referring to FIG. 1, a reflector unit (1) is fabricated from a plastics material and has a substantially planar rectangular base (2) with a pair of trapezoidal substantially vertical sides (3) extending from the long sides of the base. The trapezoidal sides (3) are arranged so that they form an approximately planar square face (4) parallel to the base (2) and a pair of inclined faces one (5) orientated operatively rearwards and the other (6) orientated operatively frontwards.

Incident light reflectors (7) of a reflective plastics material are located within suitably shaped recesses in each of the faces (4), (5) and (6). The depth of the recesses is such that the reflectors (7) are flush with the surfaces of the faces. The reflector unit has a bolt (8) extending approximately normally to the base (2).

In use, the bolt (8) is located through an aperture in the side body panel or chassis of an abnormally long vehicle or trailer, the reflector unit orientated such that the faces (4), (5) and (6) will reflect incident light towards the side, rear and front respectively of the vehicle or trailer. Once orientated, the reflector unit is firmly affixed to the side of the vehicle or trailer by a nut located on the opposite side of the body panel to the reflector unit. Ideally a number of reflector units are affixed to both sides of the vehicle or trailer, the units being spaced apart by a constant distance of one meter.

Figure 2:
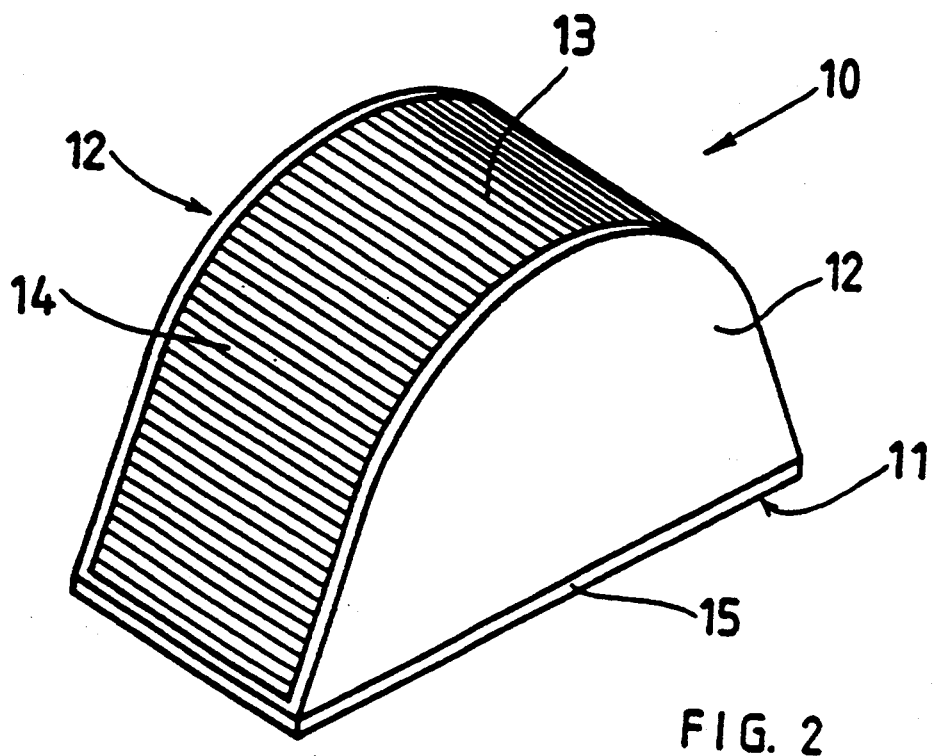
FIG. 2 is an isometric view of a second embodiment of a reflector unit according to the invention.

Referring to FIG. 2, a reflector unit (10) has a substantially planar rectangular base (11) and a pair of part circular substantially vertical sides (12) extending from the long sides of the base (11). The arcuate surface (13) formed by the sides (12) has a strip of light reflective tape (14) attached thereto which extends from one of the short sides of the base (11) to the opposite short side. The base (11) has a strip of double-sided adhesive tape (15) attached thereto for mounting the reflector unit (10) to the sides of a vehicle or trailer.

In use, the backing paper of the adhesive tape (15) is removed, the reflector unit (10) orientated such that incident light will be reflected towards the rear side and front of a vehicle, and the reflector unit is firmly pressed against the side of the vehicle or trailer. Ideally, where a number of reflector units are used, the spacing between the units should be one meter.

Figure 3:
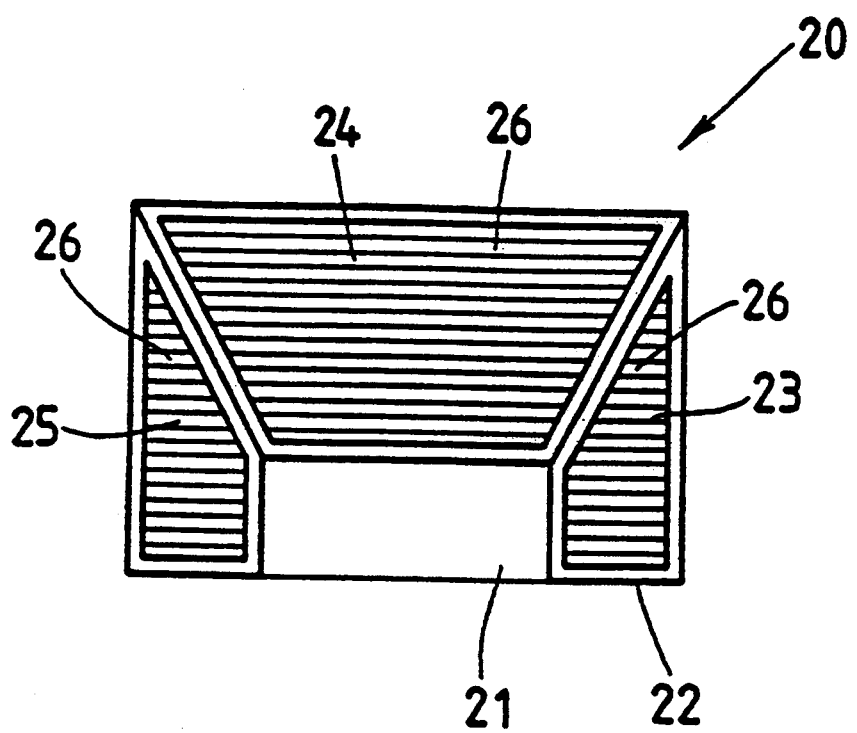
FIG. 3 is an underplan view of a third embodiment of a reflector unit according to the invention.

Referring to FIG. 3, a reflector unit (20) has a substantially planar rectangular base (21) and a top face (not shown) spaced apart from the base by four sides (22), (23), (24) & (25), the top face is larger than the base and side (22) is approximately normal to the top face and base (21). Consequently the sides (23), (24) & (25) are angled. Incident light reflectors (26) are affixed to each of the angled sides (23), (24) & (25).

In use, a number of these reflector units are affixes to the undersides of a vehicle adjacent its sides so that incident light is reflected towards the rear, side and front of the vehicle. The reflector units can be so affixed by means of a bolt and nut as described for the first embodiment, or by means of double-sided adhesive tape as described for the second embodiment. When affixed to the vehicle, each unit should be spaced apart by a constant distance of one meter.

Figure 4:
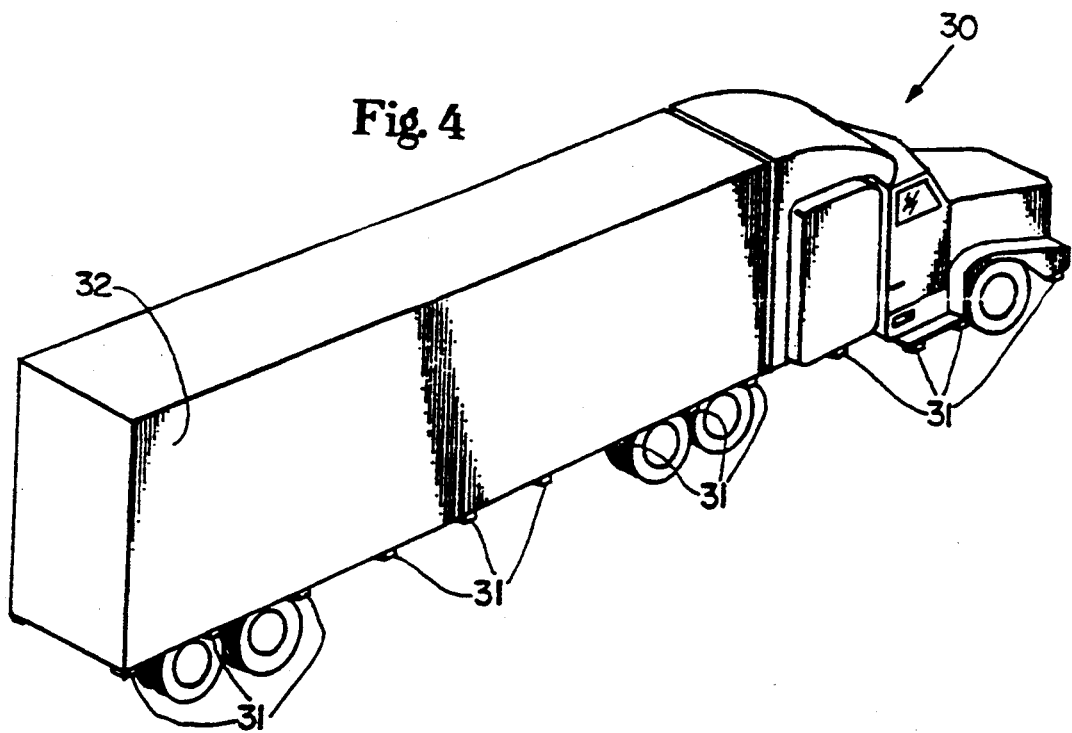
FIG. 4 is a schematic perspective view of a vehicle having a plurality of reflector units of the type illustrated in FIG. 3 affixed along one side thereof.
Figure 5:
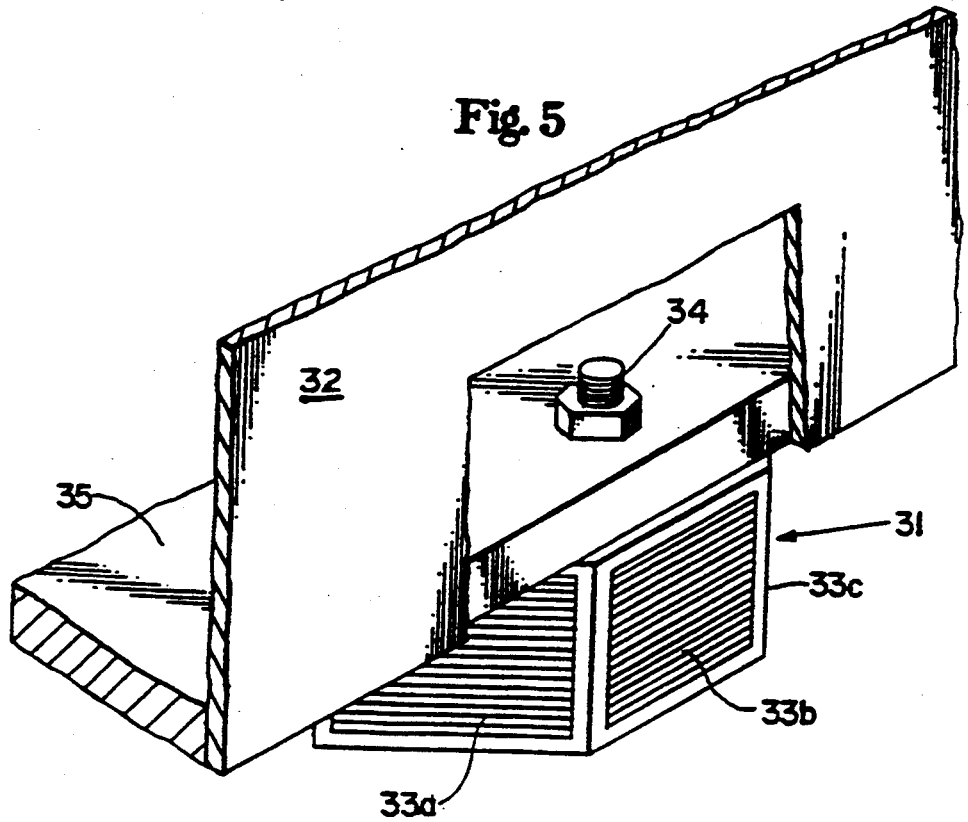
FIG. 5 is an enlarged, partial cross-sectional view of a reflector unit as illustrated in FIGS. 3 and 4, illustrated as being affixed by means of a bolt and nut arrangement.

Referring to FIGS. 4 and 5, a vehicle (30) has a number of reflector units (31) similar to that illustrated in FIG. 3 affixed along its right hand side (32). The reflector units (31) are preferably fabricated from a plastic material and each has a substantially planar rectangular base (not shown) and a top face (not shown) spaced apart from the base by four sides. Incident light reflectors (e.g., 33a–33c) are respectively affixed along the rear, side and front facing sides. A bolt (34) projects normally from the top face. In the embodiment illustrated, the reflector affixed to the rear face reflects the red portion of incident light falling on the reflector, the side facing reflector reflects the amber portion of incident light falling thereon, and the front facing reflector reflects all of the light falling thereon (i.e., white reflection).

In use the reflector units (31) are affixed to the sides of a vehicle (30) by passing the bolt (34) through an aperture (not shown) along a surface (35) of the vehicle (30). The reflector units (31) are spaced apart from each other at approximately one meter intervals. It is contemplated that in use each reflector unit 31 will preferably have each of its reflective surfaces (e.g., 33a–33c) arranged to reflect different portions of the visible light spectrum towards the rear, side and front of the vehicle (e.g., 30). As mentioned, as seen in FIGS. 4 and 5, a reflector unit 31 might preferably be arranged such that reflective surface 33a reflects an amber portion of the spectrum towards the rear of vehicle 30, reflective surface 33b reflects a red portion of the spectrum towards the side, and reflective surface 33c reflects all of the visible light spectrum (i.e., white light) towards the front. Alternatively, surface 33a could be arranged to reflect a red portion of the spectrum, surface 33b an amber portion, and so on.

It is envisaged that the reflector units (31) arranged in accordance herewith will be perceived at night by a driver of an overtaking vehicle as a series of "lights" (e.g., red lights where surfaces 33a reflect the red portions of the spectrum). The number of "lights" perceived by the other driver will provide an indication of the overall length of the vehicle and consequently indicate whether or not it is safe to overtake. Similarly the reflector units will be perceived by the driver of a vehicle approaching from the side as a series of "lights" (e.g., amber) and as a series of "lights" (e.g., white) to the driver of a vehicle approaching from the front. In each case the number of "lights" will provide information on the length of the vehicle and enable the driver of an approaching vehicle to act in accordance with this information.

It will be appreciated that variations can be made to the abovedescribed reflector unit, in particular, the reflecting surfaces can be multi-faceted and the reflectors can be arranged to reflect incident light towards the operatively upper and lower aspects of the unit, and the means for attaching the reflector unit to the sides of a vehicle can be altered as can the spacing between units, without departing from the scope of the invention.

What I claim as new and desire to secure by Letters Patent is:

1. A method of enhancing the visibility of a vehicle, and for providing an indication of the relative length of said vehicle, comprising the steps of:
    attaching at least three reflector units, each having at least one reflective surface operative to reflect and send light towards each of the rear, side and front of the vehicle, along at least one side of the vehicle;
    spacing said reflector units along said at least one side at a predetermined constant distance from one another, thereby providing a series of equally-spaced reflectors along said side of the vehicle and thus providing said indication of the length of said vehicle; and
    orienting said reflector units in use, so as to reflect incident light towards the rear, side and front of the vehicle.

2. The method of claim 1, wherein said reflectors are attached to said vehicle by means of screw threaded fasteners and nuts.

3. The method of claim 1, wherein said reflectors are attached to said vehicle by means of an adhesive.

4. A method of enhancing the visibility of a vehicle, and for providing an indication of the relative length of said vehicle, comprising the steps of:
    attaching at least three reflector units, each having at least one reflective surface operative to reflect and send light towards each of the rear, side and front of the vehicle, along the underside of the vehicle adjacent at least one side thereof;
    spacing said reflector units adjacent said at least one side at a predetermined constant distance from one another, thereby providing a series of equally-spaced reflectors adjacent said side of the vehicle and thus providing the indication of the length of said vehicle; and
    orienting said reflector units in use, so as to reflect incident light towards the rear, side and front of the vehicle.

5. The method of claim 4, wherein said reflectors are attached to said vehicle by means of screw threaded fasteners and nuts.

6. The method of claim 4, wherein said reflectors are attached to said vehicle by means of an adhesive.

* * * * *